(12) United States Patent
Lu et al.

(10) Patent No.: US 12,248,230 B2
(45) Date of Patent: Mar. 11, 2025

(54) STABILIZER

(71) Applicant: GUILIN ZHISHEN INFORMATION TECHNOLOGY CO., LTD., Guangxi (CN)

(72) Inventors: Lifen Lu, Guangxi (CN); Zhitao Liu, Guangxi (CN); Xiao Su, Guangxi (CN)

(73) Assignee: GUILIN ZHISHEN INFORMATION TECHNOLOGY CO., LTD., Guangxi (CN)

( * ) Notice: Subject to any disclaimer, the term of this patent is extended or adjusted under 35 U.S.C. 154(b) by 115 days.

(21) Appl. No.: 17/793,769

(22) PCT Filed: Nov. 12, 2020

(86) PCT No.: PCT/CN2020/128297
§ 371 (c)(1),
(2) Date: Jul. 19, 2022

(87) PCT Pub. No.: WO2021/147476
PCT Pub. Date: Jul. 29, 2021

(65) Prior Publication Data
US 2023/0063155 A1 Mar. 2, 2023

(30) Foreign Application Priority Data
Jan. 20, 2020 (CN) .......................... 202010066149.5

(51) Int. Cl.
*G03B 17/56* (2021.01)
*F16M 11/12* (2006.01)
(Continued)

(52) U.S. Cl.
CPC ......... *G03B 17/561* (2013.01); *F16M 11/125* (2013.01); *F16M 11/18* (2013.01); *F16M 13/04* (2013.01)

(58) Field of Classification Search
CPC .... G03B 17/56; G03B 17/561; G03B 17/563; F16M 11/041; F16M 11/06; F16M 11/12;
(Continued)

(56) References Cited

U.S. PATENT DOCUMENTS

| 9,377,041 B2 | 6/2016 | Sgroi et al. |
| 10,178,209 B1 | 1/2019 | Hesse |

(Continued)

FOREIGN PATENT DOCUMENTS

| CN | 106015852 A | 10/2016 |
| CN | 205908975 U | 1/2017 |

(Continued)

OTHER PUBLICATIONS

International Search Report and Written Opinion Application No. PCT/CN2020/128297, dated Jan. 27, 2021, 15 pages.
(Continued)

*Primary Examiner* — Clayton E. LaBalle
*Assistant Examiner* — Fang-Chi Chang
(74) *Attorney, Agent, or Firm* — Zhong Law, LLC

(57) ABSTRACT

The present disclosure discloses a stabilizer configured to be rotatable about a pitch axis and a roll axis for stabilizing a photographing device. Said stabilizer includes: a handle with a pitch axis motor, on a side face of which is provided with a first coupling part; a connection arm, on the distal end portion of which is provided with a holder driven by the roll axis motor and on a side face of which is provided with a second coupling part coupled with said first coupling part, such that said connection arm can move towards the distal direction or the proximal direction relative to said handle, and can move into a storage configuration with reduced storage space.

13 Claims, 11 Drawing Sheets

(51) Int. Cl.
*F16M 11/18* (2006.01)
*F16M 13/04* (2006.01)

(58) Field of Classification Search
CPC .. F16M 11/121; F16M 11/123; F16M 11/128; F16M 11/2007; F16M 11/2035; F16M 11/2042; F16M 11/205; F16M 11/2071; F16M 11/24; F16M 11/26; F16M 11/28; F16M 11/38; F16M 13/04
See application file for complete search history.

(56) References Cited

U.S. PATENT DOCUMENTS

| | | |
|---|---|---|
| 2013/0176412 A1 | 7/2013 | Chen |
| 2017/0108167 A1 | 4/2017 | Fan |
| 2018/0131848 A1 | 5/2018 | Laliberte |

FOREIGN PATENT DOCUMENTS

| | | | |
|---|---|---|---|
| CN | 107466471 | A | 12/2017 |
| CN | 107676614 | A | 2/2018 |
| CN | 206958544 | U | 2/2018 |
| CN | 207527272 | U | 6/2018 |
| CN | 207945466 | U | 10/2018 |
| CN | 208185758 | A | 12/2018 |
| CN | 208253098 | U * | 12/2018 |
| CN | 208687324 | U | 4/2019 |
| CN | 208779087 | U | 4/2019 |
| CN | 109899641 | A | 6/2019 |
| CN | 209622439 | U | 11/2019 |
| CN | 111271554 | A | 6/2020 |
| CN | 211551114 | A | 9/2020 |
| CN | 211551114 | U | 9/2020 |
| JP | 2020008844 | A | 1/2020 |

OTHER PUBLICATIONS

European Search Report for EP Application No. 20916076, dated Jan. 29, 2024.
Japanese Office Action for JP Application No. 12022-543707, dated Apr. 2, 2024.
Chinese First Office Action for CN Application No. 202010066149.5, dated Dec. 2, 2020.
Chinese Second Office Action for CN Application No. 202010066149.5, dated Apr. 13, 2021.
Chinese Third Office Action for CN Application No. 202010066149.5, dated Sep. 7, 2021.
Chinese Search Report or CN Application No. 202010066149.5, dated Nov. 26, 2020.

* cited by examiner

STABILIZER

CROSS-REFERENCE TO RELATED APPLICATIONS

This application is the U.S. national stage of PCT/CN2020/128297 filed Nov. 12, 2020, which claims priority benefit to Chinese Patent Application No. 202010066149.5 filed Jan. 20, 2020. The contents of the above-mentioned applications are hereby incorporated by reference in their entireties.

TECHNICAL FIELD

The disclosure relates to a technical field of photography accessories, in particular to a stabilizer.

BACKGROUND

With the rapid development in the technical field of photographing device, people increasingly tend to use mobile electronic device, such as cameras or mobile phones, to take outdoor photographs. To improve photographing effect, the photographer usually use a handheld stabilizer to carry mobile phone for photographing. However, the stabilizer in current technology normally locks its rotation in all directions when it is in storage configuration, thus resulting in a problem that the stabilizer requires a relatively large storage space to accommodate the stabilizer.

Therefore, there is a need to accommodate a stabilizer with a relatively small space in storage.

SUMMARY

The present application discloses a stabilizer that solves at least in part of the above-identified technical problems.

A stabilizer is provided according to an aspect of the present disclosure, which is configured to be rotatable about a pitch axis and a roll axis for stabilizing a photographing device. Said stabilizer includes: a handle with a pitch axis motor, where on a side face of the handle is provided with a first coupling part; a connection arm, where on the distal end of the connection arm is provided with a holder driven by a roll axis motor, and on side face of the holder is provided with a second coupling part coupled with said first coupling part, such that said connection arm can move towards distal or proximal direction relative to said handle, and can be moved to a storage configuration with reduced storage space.

Compared with current technologies, the stabilizer according to an embodiment can be moved to a storage configuration with reduced storage space by moving the connection arm of roll axis motor and the handle with a pitch axis motor when the stabilizer is in a non-operational state, thus reducing the needed storage space of the stabilizer in storage configuration, and improving the convenience of using the stabilizer of the embodiment outdoors.

Preferably, a side face of said handle is provided with a first retaining part, and a side face of said connection arm is provided with a second retaining part, which is able to fixedly retain with said first retaining part as said connection arm moves into a position towards distal direction relative to said handle, such that said connection arm and said handle are retained in the operating configuration.

Preferably, said holder extends laterally to a proximal-distal direction on said connection arm, and meanwhile is adapted as a stopper that rests on distal end of said handle as said connection arm moves into position towards proximal-distal direction relative to said handle.

Preferably, a side face of said handle is provided with a first limiting part, and a side face of said connection arm is provided with a second limiting part, which is coupled with said first limiting part to prevent separation of said connection arm from said handle.

Preferably, said second retaining part is configured to include an upper retaining portion and a lower retaining portion, which are fixedly retained with said first retaining part as said connection arm moves into position towards a proximal direction and towards a distal directions separately.

Preferably, said first retaining part and said second retaining part are configured as elastic beads and bead retaining grooves which are fit together, wherein said elastic beads are compressed as said connection arm moves towards said handle, and said elastic beads return into said bead retaining grooves as said connection arm moves into a position towards a distal direction relative to said handle, to fix said connection arm and said handle.

Preferably, said first retaining part and said second retaining part are configured as an elastic piece and a corresponding inclined surface structure, wherein said elastic piece is free of impacting force as said connection arm moves relative to said handle, and said elastic piece is compressed tightly by the inclined surface as said connection arm moves into a position towards a distal direction relative to said handle, thus locking said connection arm and said handle.

Preferably, said inclined surface structure is configured as a guide slope and a securing slope which is adjacent to said guide slope.

Preferably, said first coupling part and said second coupling part are configured as sliding fitting matched with each other, such that said connection arm is able to slide towards proximal-distal direction relative to said connection arm.

Preferably, on a side face of said handle is provided with a first electrical connector, and on a side face of said connection arm is provided with a second electrical connector connected with said first electrical connector as said connection arm moves into a position towards distal direction relative to said handle.

Preferably, said handle is configured as a telescoping structure, which is able to telescope along a proximal-distal direction.

Preferably, said connection arm is configured to incline towards the gravity center of said a pitch axis motor.

Preferably, said handle is configured with a curved surface that is able to approach said connection arm.

Some of the other features and advantages of the present disclosure are clear to the person skilled in the art. The other part will be described in the following detailed descriptions in conjunction with accompanied drawings.

BRIEF DESCRIPTION OF THE DRAWING

The embodiment of the present disclosure will be described in detail with reference to the accompanied drawings, wherein.

REFERENCE NUMBER

Figure 1:
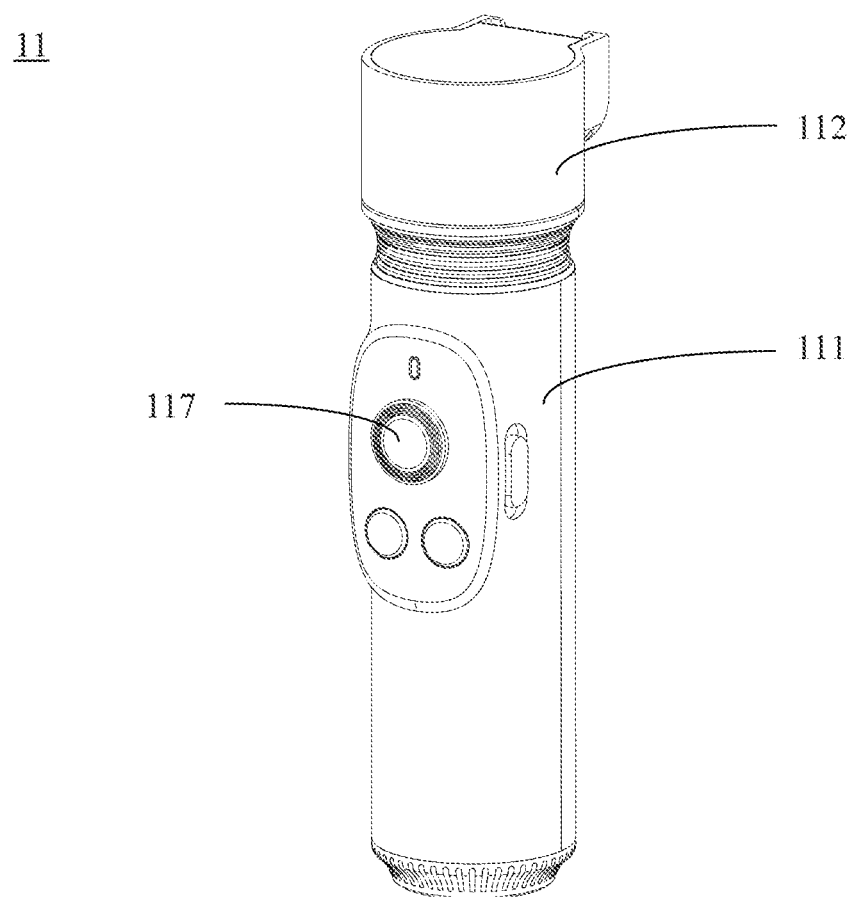
FIG. 1 is a first schematic view of a handle of a stabilizer according to an embodiment of the present disclosure.
Figure 2:
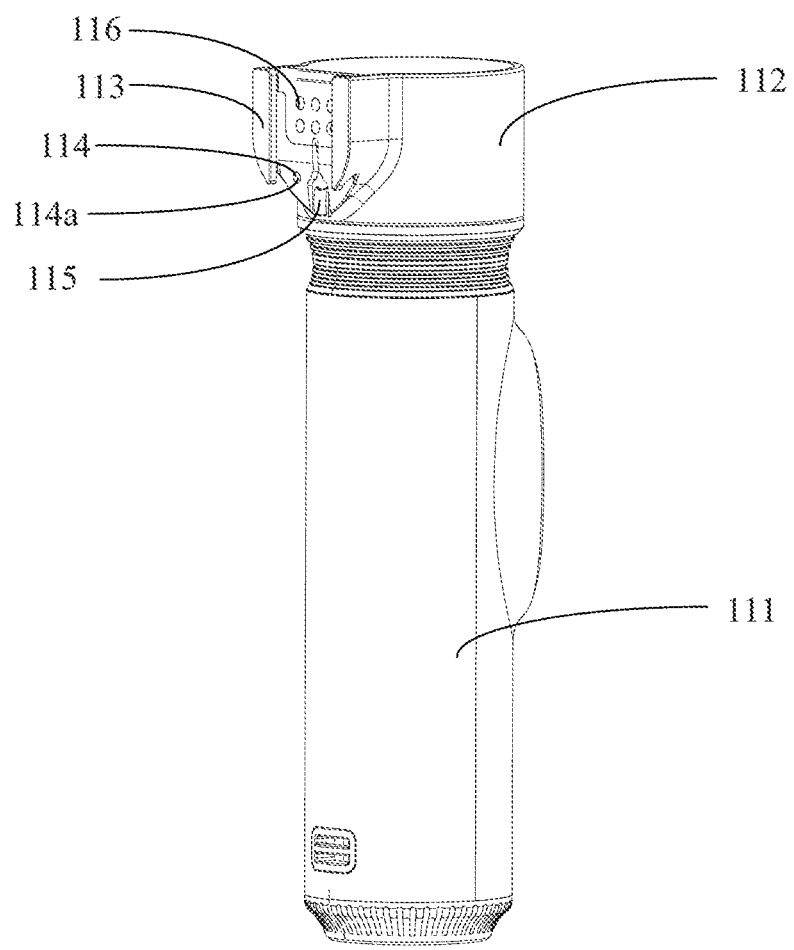
FIG. 2 is a second schematic view of a handle of a stabilizer according to an embodiment of the present disclosure.
Figure 3:
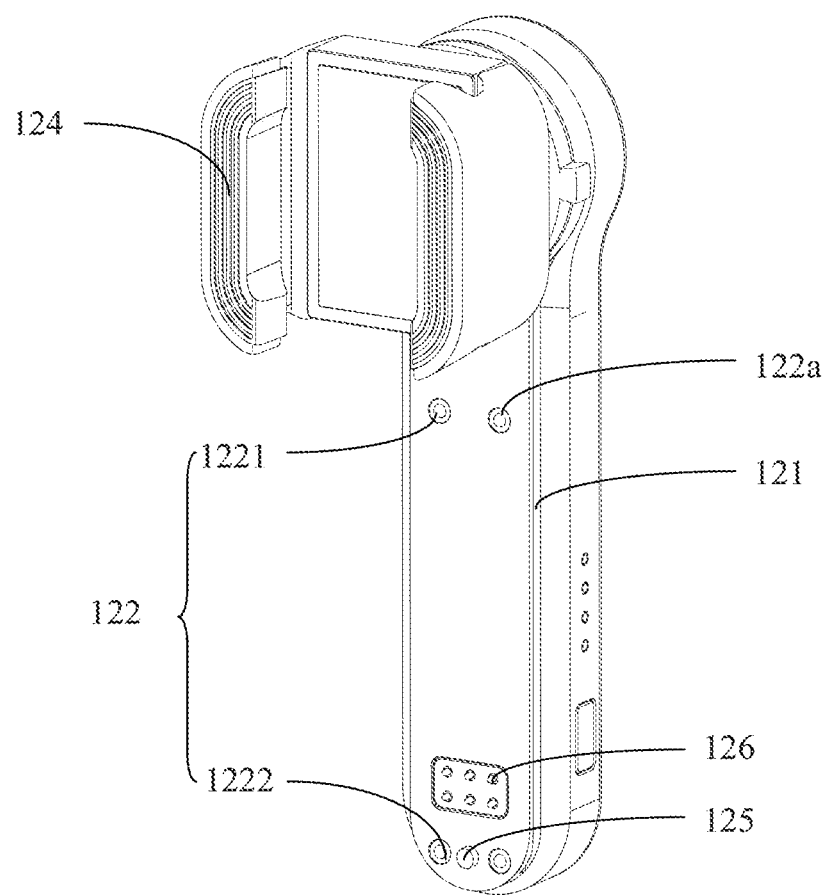
FIG. 3 is a first schematic view of a connection arm of a stabilizer according to an embodiment of the present disclosure.
Figure 4:
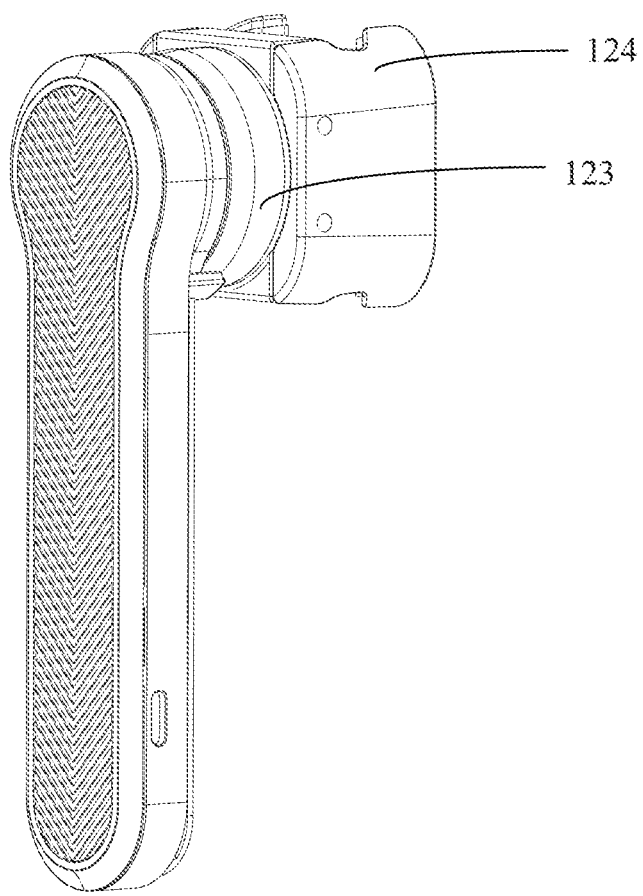
FIG. 4 is a second schematic view of a connection arm of a stabilizer according to an embodiment of the present disclosure.
Figure 5:
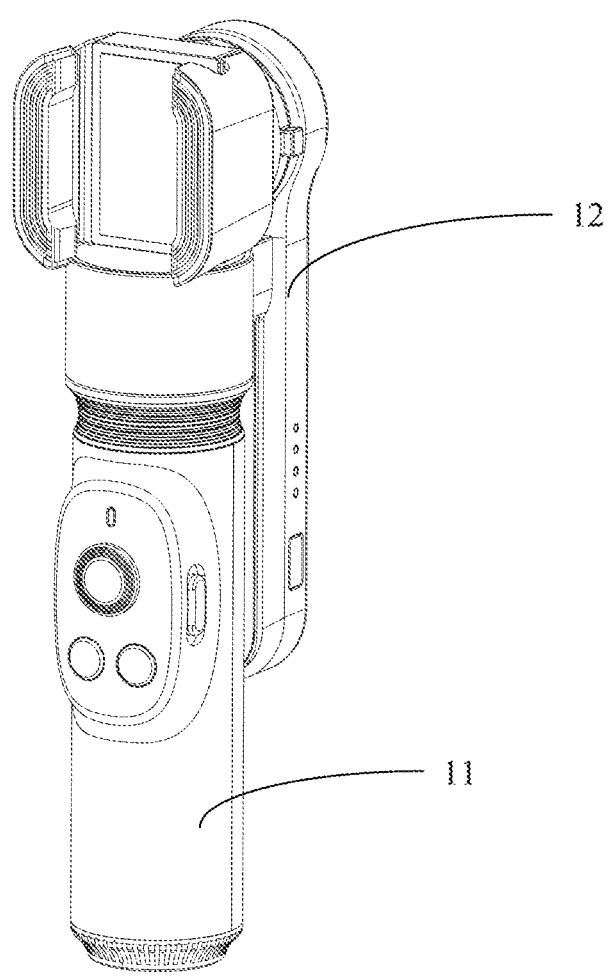
FIG. 5 is schematic view of a stabilizer in storage configuration according to an embodiment of the present disclosure, wherein a first retaining part and a second retaining part are configured with elastic beads and a bead retaining grooves which are fitting matched together.

1—Stabilizer; 11—handle; 111—fixed portion; 112—movable portion; 113—first coupling part; 113a—sliding block; 114—first retaining part; 114a—bead retaining grooves; 114b—inclined surface structure; 114ba—guide slope; 114bb—securing slope; 115—first limiting part; 116—first electrical connector; 117—adjustment indicating device; 12—connection arm; 121—second connector; 121a—sliding slot; 122—second retaining part; 122a—elastic bead; 122b—elastic piece; 1221—upper retaining portion; 1222—lower retaining portion; 123—roll axis motor; 1231—motor magnetic ring; 1232—motor coil; 1233—motor nut; 1234—motor board and gyroscope; 124—holder; 125—second limiting part; 126—second electrical connector

DETAILED DESCRIPTION

Referring to accompanied drawings, the schematic solution of the stabilizer disclosed in the present disclosure will be shown in detail. It is understood that the described embodiments represent some, rather than all, of the embodiments of the present disclosure. However, the accompanied drawings are not needed to be provided according to the size in detail embodiments, and some features may be scaled up, removed, or partially cut-in to show and to explain the disclosed content of the present disclosure. Positions of some components in accompanied drawings can be adjusted according to meet actual requirement, without any influences on the technical effects. "in the drawing" or similar expressions described in the description is not necessary to refer to all drawings or examples.

Certain directional terms for describing drawings in the context, e.g., "interior", "outside", "upper", "lower" and other directional terms, should be understood to have their plain meaning and refer to the directions as normal viewing the drawings. Unless otherwise defined, the directional terms in this description are conventional directions as substantially understood by the person in the art. In addition, in the embodiments of the present disclosure, the side closer to user is referred to as a proximal side, and the side far away from user is referred to as distal side. In the case of printing drawings on paper, the said proximal side is a lower side of drawing, and the said distal side is an upper side of drawing.

The terms in the present disclosure, such as "first", "the first," "second," "the second," and other similar terms, do not represent any sequence, amount or importance, instead of which, they are used to distinguish one component from another.

Refer to FIG. 1 to FIG. 8, stabilizer 1 includes a handheld handle 11 and a connection arm 12 which carries a photographing device, such that the stabilization of photographing device can be maintained by the stabilizer 1 as a user uses the photographing device.

Specifically, the stabilizer 1 can be a two-axis stabilizer 1, which is rotatable about a pitch axis and about a roll axis, to prevent the photographing device from the instabilities in the directions of the pitch axis and roll axis, where the handle 11 can be configured as a fixed portion 111 and a movable portion 112, and the interior of the handle 11 receives a pitch axis motor. Under the drive of a pitch axis motor, the movable portion 112 can rotate relative the fixed portion 111. Outside of the movable portion 112 is provided with a first coupling part 113, and on the side face of the connection arm 12 is provided with a second coupling part 121, via the fitting connection of the first coupling part 113 and the second coupling part 121, the connection arm 12 can be mounted on the movable portion 112 of the handle 11. In addition, the end of the connection arm 12, which is distal from the user side and does not connected to the handle 11, i.e., the distal end of the connection arm 12, via roll axis motor 123 connects to a holder 124 used for clamping a photographing device, such that the photographing device can be rotated under the drive of roll axis motor 123, and thus can be rotated about the roll axis, about the pitch axis or about the roll axis and pitch axis together relative to the fixed portion 111 of the handle 11. Users can select the rotation according to actual needs. Optionally, the fixed portion 111 of the handle 11 can be configured with a telescoping structure which telescopes along the proximal-distal direction, such that the distance between it and the photographing device can be adjusted as the stabilizer is used, and the convenience of the stabilizer 1 in the embodiment can be further improved.

Furthermore, via the fitting connection between the first coupling part 113 and the second coupling part 121, the connection arm 12 can be movable mounted on the movable portion 112 of the handle 11 towards distal direction or proximal direction relative to the handle 11, such that the photographing device can be relatively close to the user or far away from the user. It can be understood that the movement of the connection arm 12 towards distal direction relative to the handle 11 is to move the photographing device far away from the user and the movement of the connection arm 12 towards proximal direction relative to the handle 11 is to move the photographing closer to the user, where the configuration after moving the connection arm 12 into a position towards distal direction relative to the handle 11 or the configuration after moving the connection arm 12 towards distal direction to a required distance is defined as operating configuration; the configuration after moving the connection arm 12 into a position towards proximal direction or the configuration of moving the connection arm 12 towards proximal direction to the closest distance can be defined as a storage configuration. It is evident that the connection arm 12 moves closer to the handle 11 towards the proximal direction, thus significantly reducing the storage space in comparison with the overall storage space as both the connection arm 12 and the handle 11 are in operating configuration. Optionally, a locking member can be provided between a holder 124 and the roll axis motor 123, and be provided between the movable portion 111 of the handle 11 and the pitch axis motor for the stabilizer 1 of the embodiment, to limit the roll movement of the holder 124 relative to the handle 11 and the pitch movement of the movable portion 112 relative to the fixed portion 124, preventing from the possible damage on the photographing device and the stabilizer during the storage configuration.

The first coupling part 113 and the second coupling part 121 can be further configured as mutually fittingly matched parts. For example, as shown in FIGS. 1 to 6, the first coupling part 113 can be configured as a pair of sliding blocks 113a extending along proximal-distal direction, i.e., longitudinal direction of the handle 11; the second coupling part 121 can be configured as a pair of sliding grooves 121a that receive the pair of sliding blocks 113a and extend along proximal-distal direction, i.e., the longitudinal direction of the connection arm 12, such that the connection arm 12 can be mounted on the handle 11 and slides towards proximal direction or distal direction relative to the handle 11. Preferably, the sliding blocks 113a and the sliding grooves 121a can be configured as a dovetail block 113a and a dovetail slot 121a. In an embodiment, the first coupling part 113 and the second coupling part 121 can be configured as mutually fittingly matched rolling parts such that the connection arm 12 and the handle 11 can have a relative movement, where the first coupling part 113 can be configured as a pair of rolling blocks along proximal-distal direction on the connection arm 12, and the second coupling part 121 can be configured as a pair of guide rails along proximal-distal direction on the connection arm 12. Alternatively, the first coupling part 113 and the second coupling part 121 can be configured as other structure that they can cause the relative movement of the connection arm 12 and the handle 11.

The first retaining part 114 can be further provided on a side face of the handle 11, and a second retaining part 122 can be provided on a side face of the connection arm 12, thus the first retaining part 114 and the second retaining part 122 can be fixedly retained such that the connection arm 12 and the handle 11 are retained in a required operating configuration, as the connection arm 12 moves to a required distance towards distal direction. It is understood that the required distance of moving the connection arm 12 relative to the handle 11 is located within the travel distance that the connection arm 12 moves towards distal direction relative to the handle.

Optionally, the second retaining part 122 can be configured to include an upper retaining portion 1221 which is fixedly retained with the first retaining part 114, making the connection arm 12 and the handle 11 in a storage configuration, and a lower retaining portion 1222 which makes the connection arm 12 and the handle 11 in operating configuration as the connection arm 12 moves into position towards proximal direction or distal direction relative to the handle 11. Alternatively, the second retaining part 122 can be configured to include only a lower retaining portion 1222 which is fixedly retained with the first retaining part 114, making the connection arm 12 and the handle 11 in operating configuration, as the connection arm 12 moves into a position towards distal direction relative to the handle 11, with the elimination of an upper retaining portion 1221, and therefore the connection arm 12 is not retained as it moves towards proximal direction relative to the handle 11 and it is in the storage configuration, but it is received for example by a pouch to limit the movement of the connection arm 12 and the handle 11 away from each other. Alternatively, in addition to the upper retaining portion 1221 and the lower positioning port 1222, the second retaining part 122 may also include at least an intermediate retaining portion arranged between the upper retaining portion 1221 and the lower retaining portion 1222 at equal intervals or unequal intervals; a lower retaining portion 1222, at least an intermediate retaining portion and the upper retaining portion 1221 can be fixedly retained with the first retaining part 114 during the connection arm 12 moves relative to the handle from proximal to distal, such that the connection arm 12 and the handle 11 are retained in the storage configuration, at least in an intermediate operating configuration and in final operating configuration respectively.

Exemplarily, as shown in FIGS. 1 to 6, the first retaining part 114 is configured as bead retaining grooves 114a located on the side face between the pair of sliding blocks 113, and both the upper retaining portion 1221 and the lower retaining portion 1222 of the second retaining part 122 are configured as elastic beads 122a located on the side face between the pair of sliding grooves 121a of the connection arm and matched with the bead retaining grooves 114a, where the elastic bead 122a is compressed as the connection arm 12 moves relative to the handle 11, namely during the transition of the configurations of the connection arm 12 and the handle 11; and the elastic bead 122 returns into the bead retaining grooves 114a as the connection arm moves from proximal to distal into a position relative to the handle 11, namely as the connection arm and the handle 11 are in storage configuration or operating configuration, so that the connection arm 12 and the handle 11 do not move further relative to each other and the connection arm 12 and the handle 11 are fixedly retained. It is understood that the first retaining part 114 is configured as elastic beads 122a and each retaining portion of the second retaining part 122 is configured as a bead retaining grooves 114a matched with the elastic bead 122a.

Figure 7:
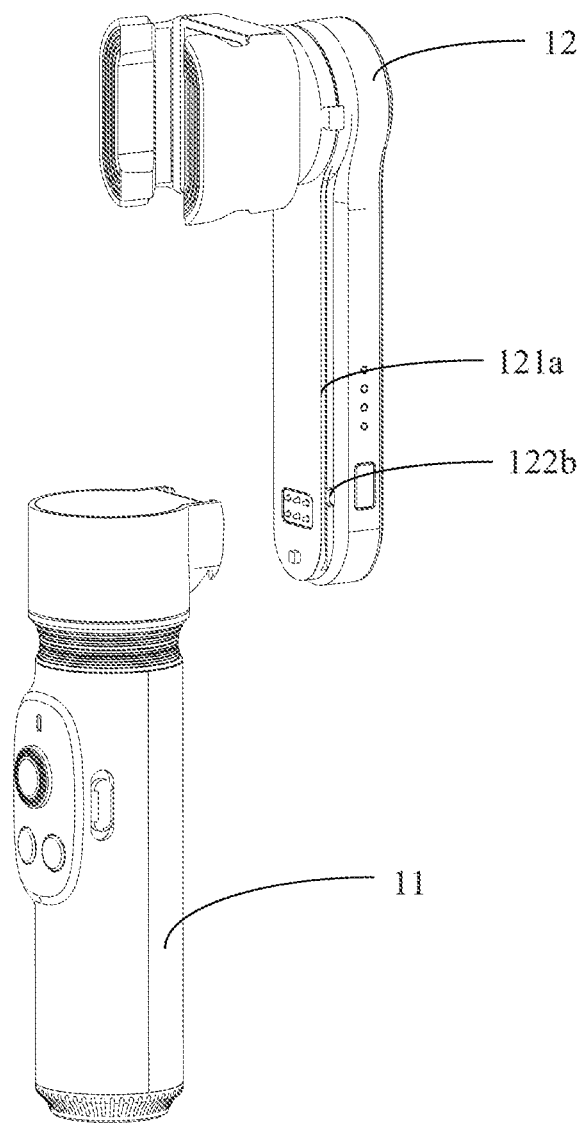
FIG. 7 is a first schematic view of a stabilizer in operating configuration according to an embodiment of the present disclosure, wherein a first retaining part is configured as an inclined surface structure, a second retaining part is configured as an elastic piece that is fittingly matched with the inclined structure surface together.
Figure 8:
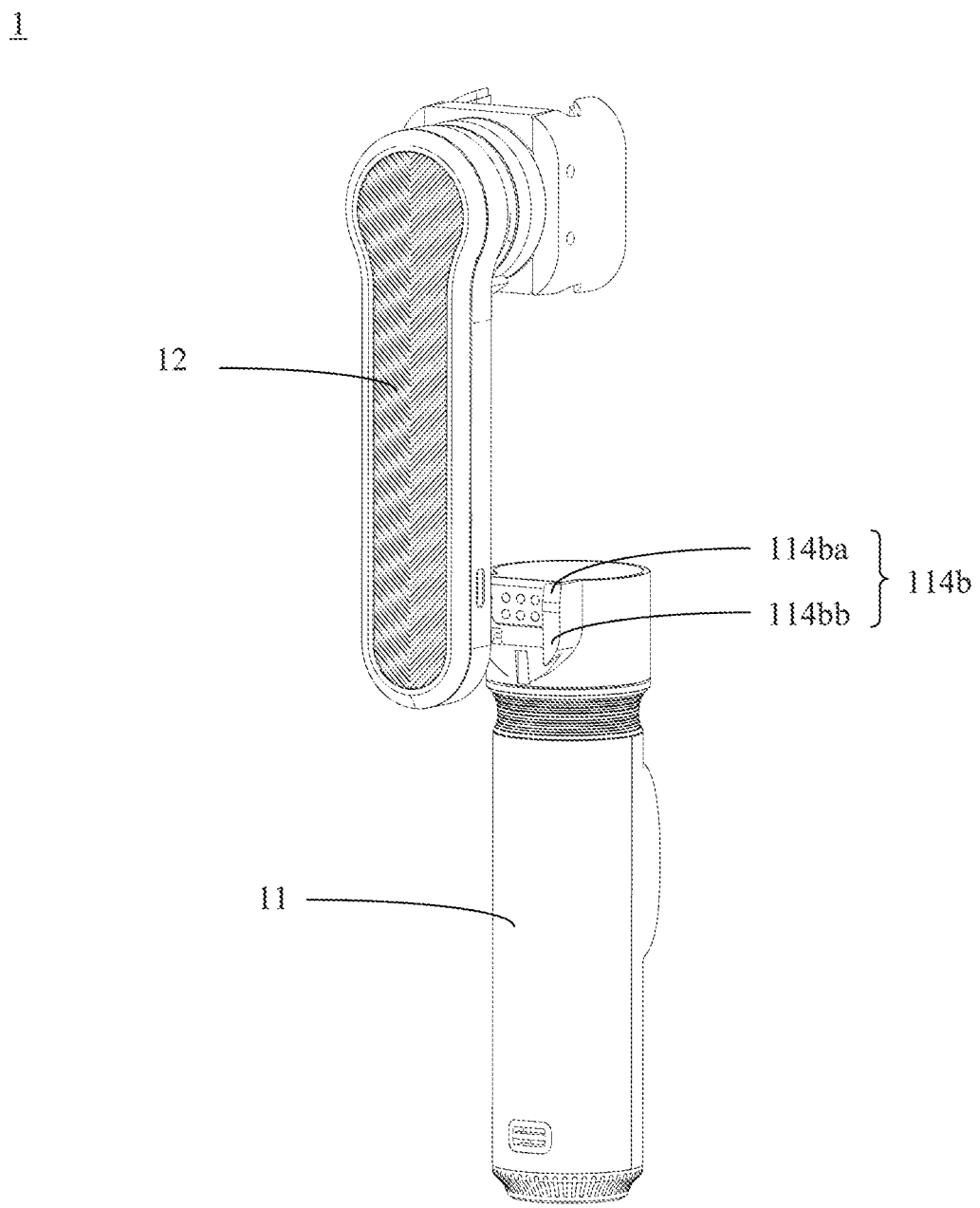
FIG. 8 is a second schematic view of a stabilizer in operating configuration according to an embodiment of the present disclosure, wherein a first retaining part is configured as an inclined surface structure, a second retaining part is configured as an elastic piece that is fittingly matched with the inclined structure surface together.

In another example, as shown in FIGS. 7 and 8, the first retaining part 114 can be configured as an inclined surface structure 114b on a side face of the sliding block 113a that is adjacent to the connection arm 12, and the lower retaining portion 1222 of the second retaining part 122 can be configured as an elastic piece 122b arranged away from the side face of the handle 11 in the sliding slot 121a and matched with the inclined surface structure 114b, where the elastic piece is free of impacting force as the connection arm 12 moves relative to the handle 11, i.e., the connection arm 12 and the handle 11 are during the transition between configurations, and the elastic piece 122b is compressed by the inclined surface structure 114b as the connection arm moves into a position from proximal to distal relative to the handle 11, i.e., as the connection arm 12 and the handle 11 are in operating configuration, such that the connection arm 12 and the handle 11 do not move further relative to each other and are fixedly retained. In particularly, the inclined surface structure 114*b* can be configured to include a guide slope 114*ba* and a locking slope 114*bb* which is adjacent to the guide slope 114*ba* from above to bottom, during the operation that the connection arm 12 moves relative to the handle 11 thus it is shifted to the operating configuration, the elastic piece is gradually compressed along the guide slope 114*ba* and is compressed tightly as it moves to the locking slope 114*bb*. It is understood that the first retaining part 114 can be configured as an elastic piece 122*b* and each retaining portion of the second retaining part 122 can be configured as an inclined surface structure 114*b* fitting with the elastic piece 122*b*.

Figure 6:
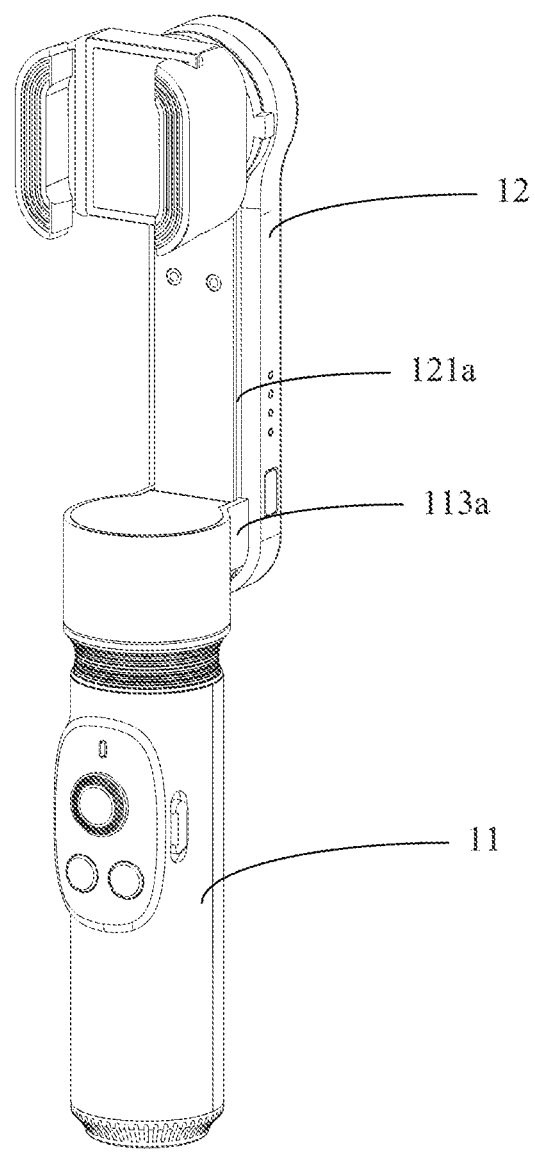
FIG. 6 is a schematic view of a stabilizer in operating configuration according to an embodiment of the present disclosure, wherein a first retaining part and a second retaining part are configured with elastic beads and bead retaining grooves which are fittingly matched together.

After the connection arm 12 moves into the storage configuration or final operating configuration relative to the handle 11, preventing the stabilizer 1 from possible damage as user moves the connection arm 12 or handle 11 further thus the connection arm 12 separates from the handle 11, the holder 124 can extend and protrude laterally to the proximal-distal direction, as shown in FIGS. 1 and 6, towards the side face where the handle 11 is mounted at the connection arm 12, such that the connection arm 12 can be used as a stopper which rests on a distal end of said handle as the connection arm 12 moves into a storage configuration relative to the handle 12, and preventing the connection arm 12 from moving closer to the handle 11. Furthermore, a first limiting part 115 can be provided on a side face of the handle 11 and a second limiting part 125 can be provided on a side face of the connection arm 12 and is matched with the first retaining part 114, to limit the further movement of the connection arm 12 relative to the handle 11 as the connection arm 12 moves into the final operating configuration towards distal direction relative to the handle 11. Exemplarily, the first retaining part 115 can be configured as retaining grooves but the second retaining part 125 can be configured as retaining pins, the retaining pins fall into the retaining grooves as the connection arm 12 moves far away from the handle 11 into a final operating configuration. It is understood that the maximum distance between the first retaining part 115 and the second retaining part 125 cannot be smaller than the travel distance that the connection arm 12 moves relative to the handle 11, so as not to affect the positioning between the connection arm 12 and the handle 11.

The first electrical connector 116 can be further arranged on a side face of the movable portion 112 of the handle 11, and at least one second electrical connector 126 which is electrically connected with the first electrical connector 116 can be provided on the side face of the connection arm 12 as the connection arm moves into the intermediate operating configuration relative to the movable portion 112 or into the final operating configuration. In addition, the interior of the fixed portion 111 can receive batteries and its side face can be provided with an adjustment indicating device 117 which is electrically connected with the first electrical connector 116 via interconnected interior of fixed portion 111 and the movable portion 112, and the interior of the connection arm 12 can receive the control device electrically connected with the second electrical connector 126.

Exemplarily, the batteries are connected with the control device via the first electrical connector 116 and the second electrical connector 121, and supply power to other devices which are electrically connected with the control device. The adjustment indicating device 117 can be activated by user and respond to the activation with sending indicating signals to the first electrical connector 116, to the second electrical connector (which is connected with the first electrical connector) and the control device, such that the control device generates control signals according to the indicating signals and sends them to the pitch axis motor and/or roll axis motor 123 for control. Further, the first electrical connector 116 can be configured with six elastic needles, and the second electrical connector 126 can be configured with six elastic contact points and the six elastic contact points can include two groups receiving/sending terminals, ground signal and so on. It can be seen that when the connection arm 12 moves relative to the handle 11 into an intermediate operating configuration or a final operating configuration, the six elastic needles connect with the six elastic contact points correspondingly to receive the signals. Optionally, adjustment indicating device 117 can be configured to include a rocker, horizontal and vertical photographing shift button, a mode button and a zoom button.

Figure 9:
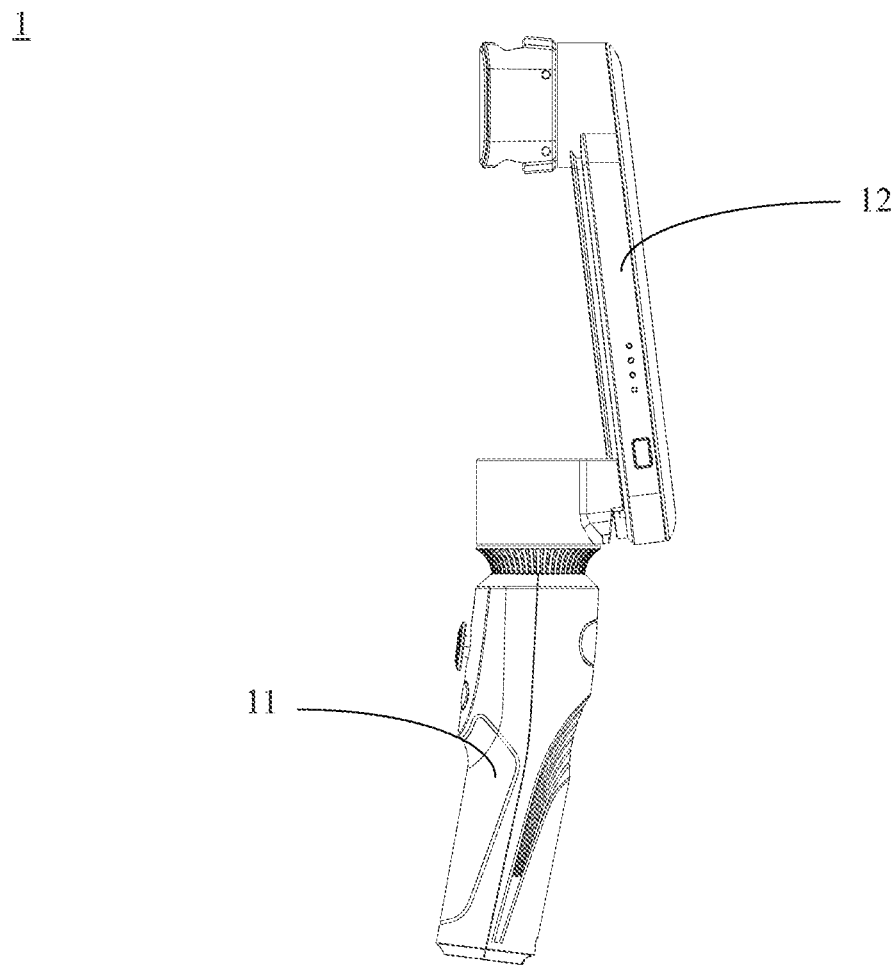
FIG. 9 is a schematic view of a stabilizer in operating configuration according to an embodiment of the present disclosure, wherein a connection arm and a handle axis are not parallel.
Figure 10:
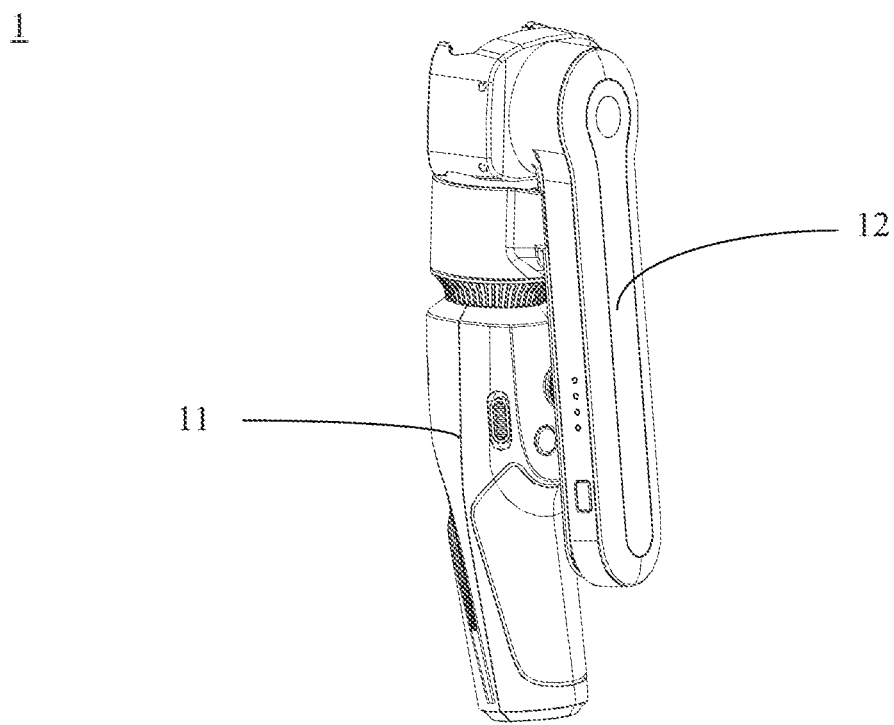
FIG. 10 is a schematic view of a stabilizer in storage configuration according to an embodiment of the present disclosure, wherein a connection arm and a handle axis are not parallel.

Optionally, as shown in FIGS. 9 and 10, the connection arm 12 is configured to be inclined towards the gravity center of the pitch axis motor, such that the axis of the connection arm 12 approaches the axis of the handle 11, such that the gravity center of the connection arm 12 is closer to the gravity line of the pitch axis motor as close as possible, therefore resulting in less use of force, less heat and less power consumption for the pitch axis motor. Furthermore, the handle 11 is configured to have a curved surface that is able to approach the connection arm 12. When the fixed portion 111 of the handle 11 is rotated relative to the movable portion 112 to an operating configuration, the curved surface of the fixed portion 111 protrudes towards the connection arm 12 for a more convenient holding feeling for the user. When the fixed portion 111 of the handle 11 is rotated relative to the movable portion 112 to a storage configuration, the curved surface of the fixed portion is far away from the connection arm 12, resulting in a more compact stabilizer 1. Preferably, the connecting line between distal and proximal end of the fixed portion 111 can be parallel to the axis of the connection arm 12 to have a more compact stabilizer 1.

Figure 11:
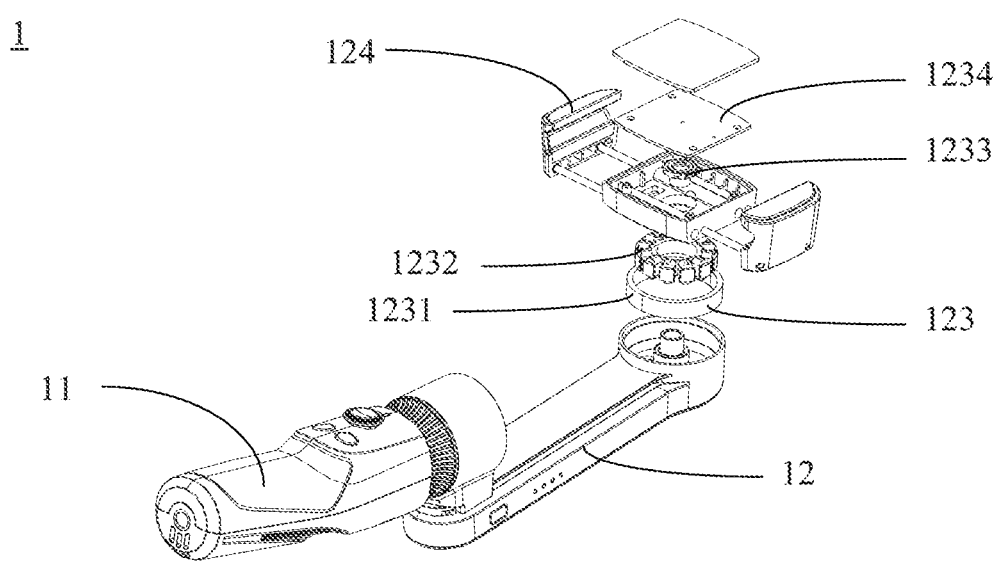
FIG. 11 is a schematic view of a stabilizer in operating configuration according to an embodiment of the present disclosure, wherein a roll axis a motor is partially embedded into a holder.

Optionally, the roll axis motor 123 can be partially embedded into the holder 124. As shown in FIG. 11, a motor magnetic ring 1231, motor coil 1232, motor nut 1233, motor board and several components of gyroscope 1234 are accommodated in the intermediate portion of the holder 124, in order to reduce the overall storage space of the roll axis motor 123, holder 124 and the connection arm 12, and the interference of the roll motor 123 can be avoided as the stabilizer 1 is applied in the panorama photographing mode.

It is understood that not each embodiment includes just a separate technical solution, even though the description is prepared according to each embodiment. The describing mode of the description is only applied for clarification, and the person in the art shall consider the description as a whole, technical solution in each embodiment can be combined properly to form the other embodiments which can be understood by the person in the art.

The descriptions above are merely exemplary embodiments of the present disclosure and do not intend to limit the scope of the present disclosure. Any equivalent variation, modifications and combinations made by the person in the art without departing from the concept and principles of the disclosure shall belong to the scope of the disclosure.

What is claimed is:

1. A stabilizer configured to be rotatable about a pitch axis and a roll axis for stabilizing a photographing device, the stabilizer comprising:
    a handle with a pitch axis motor, wherein on a side face of the handle is provided with a first coupling part and a first retaining part;

a connection arm, wherein on the distal end portion of the connection arm is provided with a holder driven by a roll axis motor and on a side face of the connection arm is provided with a second coupling part coupled with said first coupling part, such that said connection arm is able to move towards distal direction or proximal direction relative to said handle, and move into a storage configuration with a reduced storage space, wherein a side face of the connection arm is provided with a second retaining part, which is able to fixedly retain with said first retaining part as said connection arm moves into a position towards distal direction relative to said handle, such that said connection arm and said handle are retained into an operating configuration.

2. The stabilizer according to claim 1, wherein said handle is configured with a fixed portion and a movable portion which internally receives said pitch axis motor, said first coupling part is provided at outside of said movable portion.

3. The stabilizer according to claim 1, wherein said holder extends laterally to a proximal-distal direction on said connection arm, and said connection arm is configured as a stopper which rests on distal end of the handle as said connection arm moves into a position towards proximal direction relative to said handle.

4. The stabilizer according to claim 1, wherein a side face of said handle is provided with a first limiting part, and a second limiting part is configured on a side face of the connection arm and is coupled with said first limiting part to prevent said connection arm from separation of said handle.

5. The stabilizer according to claim 1, wherein said second retaining part is configured to include an upper retaining portion and a lower retaining portion, which are fixedly retained with said first retaining part as said connection arm moves into positions towards distal direction and proximal direction relative to said handle respectively.

6. The stabilizer according to claim 1, wherein said first retaining part and said second retaining part are configured as elastic beads and bead retaining grooves which are matched together, wherein said elastic beads are compressed as said connection arm moves towards said handle, and said elastic beads return into said bead retaining grooves as said connection arm moves into a position towards a distal direction relative to said handle, to lock said connection arm and said handle.

7. The stabilizer according to claim 1, wherein said first retaining part and said second retaining part are configured as an elastic piece and a corresponding inclined surface structure, wherein said elastic piece is free of an impacting force as said connection arm moves relative to said handle, while said elastic piece is compressed tightly by the inclined surface structure as said connection arm moves into a position towards distal direction relative to said handle, to lock said connection arm and said handle.

8. The stabilizer according to claim 7, wherein said inclined surface structure is configured as a guide slope and a securing slop which is adjacent to said guide slope.

9. The stabilizer according to claim 1, wherein said first coupling part and said second coupling part are configured as sliding fittings matched with each other, such that said connection arm can slide towards proximal-distal direction relative to said connection arm.

10. The stabilizer according to claim 1, wherein on a side face of said handle is provided with a first electrical connector, and on a side face of said connection arm is provided with a second electrical connector connected with said first electrical connector as said connection arm moves into a position towards distal direction relative to said handle.

11. The stabilizer according to claim 1, wherein said handle is configured as a telescope structure which is capable of telescoping along proximal-distal direction.

12. The stabilizer according to claim 1, wherein said connection arm is configured to incline towards the gravity center of said pitch axis motor.

13. The stabilizer according to claim 12, wherein said handle is configured with a curved surface which is capable of telescoping said connection arm.

* * * * *